Aug. 11, 1953  R. D. KODIS  2,648,435
METHOD AND APPARATUS FOR MAGNETIC TESTING
Filed Feb. 15, 1952
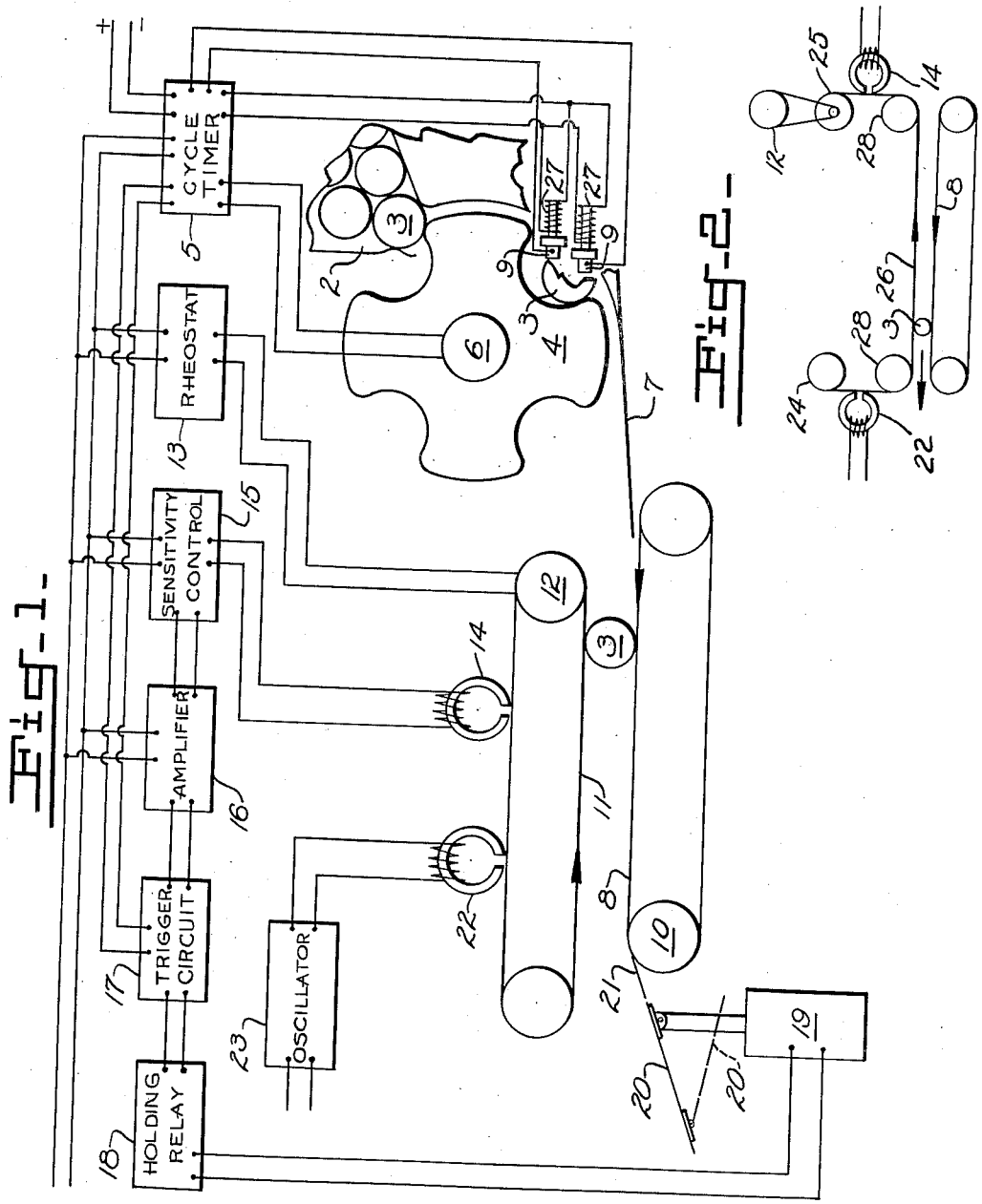
Inventor
Robert D. Kodis
By G. J. Kessenich + A. W. Dew
Attorneys Patented Aug. 11, 1953

2,648,435

UNITED STATES PATENT OFFICE 2,648,435

METHOD AND APPARATUS FOR MAGNETIC TESTING

Robert D. Kodis, Roxbury, Mass.

Application February 15, 1952, Serial No. 271,842

8 Claims. (Cl. 209—215)

(Granted under Title 35, U. S. Code (1952), sec. 266)

The invention described herein may be manufactured and used by or for the Government for governmental purposes without the payment to me of any royalty thereon.

This invention relates to non-destructive testing, and is more particularly related to a novel method and apparatus for the detection of flaws in ferromagnetic objects.

The use of magnetism for detecting physical or chemical imperfections, inhomogeneities or variations, hereafter called "flaws," in ferromagnetic objects is now extensively employed in the industrial field. The method of magnetic flaw detection most commonly used is magnetic particle inspection because it best lends itself to mass production requirements. Briefly, magnetic particle inspection comprises the inducing of magnetism in a ferromagnetic object and the application of magnetic powder thereto. Any flaw present in the object produces a flux leakage therein which attracts the magnetic powder. A study of the resulting powder pattern reveals to one versed in the art the extent and nature of the flaw.

However, such method is not entirely satisfactory as it requires human handling of the test object and the exercise of human judgment with the inherent problems attached thereto. The handling of the object easily disturbs the powder pattern with consequential loss of inspection information and time. Moreover, an improper application of the powder oftentimes results in false inspection information. Then too, it is very easy for an inspector to erroneously interpret as an indication of a flaw a pattern produced by a scratch or by the mechanical collection of powder due to surface conditions.

It is therefore an object of this invention to provide a method and apparatus for detecting flaws in ferromagnetic objects wherein the need for human handling and the exercise of judgment is virtually eliminated.

It is also an object of this invention to provide a magnetic flaw detecting system which is rapid, accurate, substantially automatic, and particularly well suited to the problems of mass production.

It is a specific object of this invention to provide a novel method and apparatus for registering and permanently recording on a suitable ferromagnetic recording medium the presence and characteristics of any flux leakage present in a ferromagnetic object.

The specific nature of the invention as well as other objects and advantages thereof will clearly appear from a description of a preferred embodiment as shown in the accompanying drawings in which:

Fig. 1 is a schematic diagram of the apparatus of the invention; and

Fig. 2 is a schematic view of an alternate form of the recording tape assembly.

For brevity and clearness, this invention will be described with regard to the inspection of cylindrical objects such as pins. It should be understood, however, that this invention may also be used for components of various shapes merely by providing suitable handling apparatus. Furthermore, the present invention need not be limited to the use of residual magnetism as described herein but may also employ continuous magnetism if so desired.

In Fig. 1 there is illustrated a preferred application of the present invention wherein there is provided a magazine 2 in which a plurality of specimens 3 to be inspected are stored for feeding to a sprocket feeder 4. Sprocket 4 is energized by a magnetic clutch 6 engageable with a source of power (not shown). Partially encircling feeder 4 and extending tangentially therefrom is a ramp 7 cooperating with feeder 4 to carry each specimen 3 from magazine 2 to a horizontally disposed endless conveyor belt 8.

Disposed below magazine 2 there is provided a pair of electrical contacts 9, each mechanically attached to a solenoid 27. Contacts 9 are located adjacent feeder 4 and are normally retracted sufficiently for one of specimens 3 to pass thereby. When solenoids 27 are energized, contacts 9 will move forward momentarily into the path of movement of specimen 3 for a purpose to be later shown.

Conveyor belt 8 is driven by a conventional constant speed motor 10. Above and parallel to conveyor belt 8, there is provided an endless and longitudinally disposed inspection belt 11 fabricated from a ferromagnetic material. Inspection belt 11 is so spaced from conveyor belt 8 that specimen 3 will be contacted on opposite sides by the upper portion of conveyor belt 8 and the lower portion of inspection belt 11 as it passes thereby. Since inspection belt 11 and conveyor belt 8 are both arranged to travel in a counter-clockwise direction, the upper portion of conveyor belt 8 and lower portion of inspection belt 11 will be moving in opposite directions. Inspection belt 11 is motivated by a variable speed motor 12 controllable by a rheostat 13. An inclined ramp 21 is positioned at the end of belt 8 and is provided with a spring-biased trap door 20 operated by a solenoid 19.

Adjacent to the upper section of inspection belt 11 there is provided a magnetic recorder head 14 electrically connected to a sensitivity control unit 15. Also adjacent to the upper section of inspection belt 11 and located beyond head 14, in respect to the directional travel of inspection belt 11, there is provided an erase head 22 connected to an oscillator 23.

The magnetic recorder head circuit also includes an amplifier 16, a trigger circuit 17, and a holding relay 18. These are so related electrically that a predetermined electrical signal induced in head 14 by the movement thereby of a magnetized portion of belt 11 will cause solenoid 19 to be energized and open trap door 20.

The apparatus hereinbefore described operates in a cycle controlled by a timer 5 which performs certain operations, hereinafter described, at intervals adjusted to the time required to complete the inspection cycle. Timer 5 commences the cycle by energizing magnetic clutch 6 to engage feeder 4 and cause sufficient rotation thereof to transfer one of specimens 3 from magazine 2 to contacts 9.

Timer 5 then energizes solenoids 27 to close contacts 9 against specimen 3, whereupon a charge of direct current is passed through contacts 9 to induce magnetism in specimen 3. Timer 5 next disconnects the power from solenoids 27 allowing contacts 9 to open. Thereupon feeder 4 is again rotated and thereby delivers specimen 3 down the inclined portion of ramp 7 onto conveyor 8. At the same time feeder 4 is delivering specimen 3 from contacts 9 to conveyor 8, another sprocket of feeder 4 is transferring the next leading specimen in magazine 2 to contacts 9.

Conveyor belt 8 moves specimen 3 into contact with the oppositely moving portion of inspection belt 11. Since the speed of conveyor belt 8 is constant and that of inspection belt 11 is variable, the difference in speed therebetween may be adjusted so as to not only move specimen 3 from one end of the conveyor to the other, from right to left as shown in Fig. 1, but also rotate specimen 3 at least one complete revolution in order to effect contact of the entire periphery thereof with the surface of inspection belt 11.

Any flaw present in specimen 3 will cause a flux leakage therein. As a result of contact between the periphery of specimen 3 and the surface of inspection belt 11, a facsimile of the flux leakage pattern is registered on inspection belt 11 providing inspection information that is accurate and not easily disturbed by handling. Moreover, the resulting pattern also reveals information concerning the magnitude, shape, and character of the flaws existent in specimens 3.

When only a cursory inspection is desired, the apparatus of Fig. 1 is employed. Sensitivity control unit 15 is adjusted to accept only those signals which exceed a predetermined amplitude. Any signal exceeding this limit passes through amplifier unit 16 to be amplified sufficiently to cause trigger circuit 17 to close self-holding relay 18 and thereby operate solenoid 19 which opens spring-closed trap door 20 to divert the faulty specimen into a reject container (not shown).

Thereafter, timer 5, which has been adjusted for the time required for a specimen to travel from contacts 9 to trap door 20, resets the trigger circuit 17 which opens relay 18 to permit spring-operated trap door 20 to close. Magnetic clutch 6 is then energized to start the next cycle of the apparatus. If the next specimen is acceptable, it passes over the closed trap door 20 to the next operation in the production line.

In order that the inspection belt 11 may be used continuously, oscillator 23 supplies erase head 22 with a high frequency signal which demagnetizes the moving inspection belt 11 prior to the initiation of the next inspection cycle.

In Fig. 2 there is disclosed an alternate construction for the recording tape unit wherein the record of the flux leakage pattern produced by flaws in specimens 3 may be indefinitely retained. Such construction comprises a supply reel 24 containing a quantity of ferromagnetic tape 26 and a winding reel 25, driven by a variable speed motor similar to motor 12 of Fig. 1, upon which tape 26 is wound and preserved available for future reference. In this construction, erase head 22 precedes recorder head 14, in relation to the directional movement of tape 26, thereby enabling a previously used tape to be employed. A pair of spaced apart rollers 23 maintains tape 26 parallel to conveyor belt 8. The remainder of the apparatus is identical to that disclosed in Fig. 1 and operates in the same way.

It is readily apparent from the foregoing description that there is here provided a novel method and apparatus wherein a ferromagnetic medium is employed to record flux leakage patterns in a manner particularly applicable to the requirements of mass production. The system here proposed is accurate, rapid, and substantially automatic. The invention also provides a novel method of permanently and accurately recording magnetic flux leakage patterns which, if desired, may be made visible by suitable means. For example, the recording medium may be subjected to the application of magnetic powder whereupon such powder will collect about any magnetic flux leakage therein according to the direction and amount of the magnetic lines of force comprising such leakage.

I claim:

1. The method of successively inspecting a plurality of ferromagnetic bodies for structural flaws comprising the steps of magnetizing each body to effect leakage of magnetic flux in the vicinity of any flaws therein, magnetically transferring the pattern formed by the flux leakage to a demagnetized ferromagnetic medium during relative movement between the body and the medium, converting the magentic pattern to a corresponding electrical signal, and differentiating between predetermined acceptable and non-acceptable amplitudes of signal.

2. The method of inspecting cylindrical ferromagnetic bodies for structural flaws comprising the steps of magnetizing each body to effect leakage of magnetic flux in the vicinity of flaws therein, establishing contact between the entire outer periphery of each body and a moving demagnetized ferromagnetic medium whereby any flux leakage in each body is transferred to the ferromagnetic medium as a magnetic pattern, scanning the medium to induce an electrical signal varying in accordance with the extent of the flux leakage pattern, differentiating between predetermined acceptable and non-acceptable amplitudes of signal, and erasing the transferred flux leakage pattern from the ferromagnetic medium following the detection thereof to permit re-use of the medium.

3. The method of successively inspecting cylindrical ferromagnetic bodies for structural flaws comprising the steps of magnetizing each body to effect leakage of magnetic flux in the vicinity of any flaws therein, establishing contact between the entire outer periphery of each body and a moving demagnetized ferromagnetic medium whereby any flux leakage in each body is transferred to the ferromagnetic medium as a magnetic pattern, simultaneously correlating each area of flux leakage pattern with the particular body producing such area, scanning the medium to induce an electrical signal varying in accordance with the extent of the transferred flux leakage pattern, differentiating between predetermined acceptable and non-acceptable amplitudes of signal to separate the bodies in accordance with their acceptability, and thereafter converting the flux leakage pattern to a visual image depicting the shape, magnitude, and character of each flaw in any of the bodies.

4. In apparatus for detecting structural flaws in ferromagnetic bodies, the combination of means for magnetizing each of the bodies to effect magnetic flux leakage in the vicinity of any flaw therein, a rotating ferromagnetic tape, means for moving each of the bodies into contact with said tape whereby any magnetic flux leakage in the body is correspondingly transferred to said tape as a magnetic pattern, a magnetic recording head having a gap therein adjacent said tape whereby any magnetic pattern therein induces a corresponding electrical signal in said head, means for differentiating between those signals which exceed a predetermined amplitude and those which do not, and means for separating the bodies into groups corresponding to the two types of signal.

5. In apparatus for detecting structural flaws in ferromagnetic cylindrical bodies, the combination of means for magnetizing each of the bodies to effect magnetic flux leakage in the vicinity of of any flaw therein, a continuously rotating ferromagnetic tape, a conveyor belt disposed parallel to said tape and sufficiently spaced apart therefrom to provide simultaneous contact on opposite sides of each magnetized body, said conveyor belt rotating at a faster rate than said ferromagnetic tape whereby each of the bodies is moved from one end of said belt to the other with at least one complete revolution and whereby any magnetic flux leakage in the bodies is correspondingly transferred to said tape as a magnetic pattern, a magnetic recording type head for detecting the presence of any magnetic pattern in said tape, means associated with said head for converting said magnetic pattern to a corresponding electrical signal, means for differentiating between those signals which exceed a predetermined amplitude and those which do not, means for separating the bodies in accordance with both types of signal, and means for canceling all magnetic patterns in said tape prior to contact thereof with the next body to be examined.

6. Apparatus for detecting the existence of structural flaws in a plurality of cylindrical ferromagnetic bodies comprising, in combination, a magazine for holding the bodies, a pair of electrical contacts disposed below said magazine, a rotating sprocket wheel for successively withdrawing each of the bodies out of said magazine and in front of said electrical contacts, electromagnetic means for momentarily energizing said contacts to move against each of the bodies for magnetization thereof, a continuously rotating conveyor belt for receiving each of the said bodies from said sprocket, a continuously rotating ferromagnetic tape disposed parallel to said belt and sufficiently spaced apart therefrom to provide simultaneous contact on opposite sides of each magnetized body, said conveyor belt rotating at a faster rate than said ferromagnetic tape whereby each of said bodies is moved from one end of said belt to the other with at least one complete revolution and whereby any magnetic flux leakage in the bodies is correspondingly transferred to said tape as a magnetic pattern, a magnetic detecting head comprising a core, a winding about a portion of said core, and a gap oppositely disposed to said winding and in close proximity to said ferromagnetic tape for detecting the presence of any magnetic patterns therein, means for converting each of said patterns to an electrical signal, means for erasing said magnetic patterns in said tape following the detection thereof, a solenoid operated inclined trap door mechanism extending from the end of said conveyor belt to receive each of the bodies thereon, and electrical relay means actuated by said electrical signal to open said trap door and permit passage of a body therethrough whenever said signal exceeds a predetermined limit.

7. The combination defined in claim 6 wherein said means for erasing said flux leakages in said tape comprises a head identical to said detecting head, and an oscillator for energizing said erase head, said erase head being disposed beyond said detecting head and in close proximity to said tape.

8. Apparatus for detecting the existence of structural flaws in a plurality of cylindrical bodies comprising, in combination, means for magnetizing each of the bodies to effect magnetic flux leakage in the vicinity of any flaw therein, a first reel having ferromagnetic tape wound thereon, a second reel oppositely disposed to said first reel and having the free end of said tape attached thereto whereby said tape is arranged to be wound thereon for storage, a conveyor belt disposed below and parallel to the portion of said tape between said reels, said conveyor belt being spaced apart from said ferromagnetic tape sufficiently to provide simultaneous contact on opposite sides of each magnetized body, said conveyor belt rotating at a faster rate than said ferromagnetic tape whereby each of said bodies is moved from one end of the belt to the other with at least one complete revolution and whereby any magnetic flux leakage in the bodies is correspondingly transferred to said tape as a magnetic pattern, a magnetic detecting head comprising a core, a winding about a portion of said core, and a gap oppositely disposed to said winding and in close proximity to said ferromagnetic tape for detecting the presence of the magnetic pattern as an electrical signal, an erasing head identical to said detecting head and disposed forwardly and parallel thereto, an oscillator circuit for energizing said erase head to nullify any magnetism in said tape prior to movement past said detecting head, a sensitivity control circuit for differentiating between signals exceeding and falling short of a predetermined amplitude, and means for separating the bodies in accordance with both types of signal.

ROBERT D. KODIS.

References Cited in the file of this patent
UNITED STATES PATENTS

| Number | Name | Date |
|---|---|---|
| Re. 21,927 | Brace | Oct. 21, 1941 |
| 2,306,211 | Geiss | Dec. 22, 1942 |
| 2,439,184 | Parvin | Apr. 6, 1948 |
| 2,444,751 | Scott | July 6, 1948 |